(12) United States Patent
Yang

(10) Patent No.: US 11,072,270 B2
(45) Date of Patent: Jul. 27, 2021

(54) TRUCK WITH LOWERABLE BED

(71) Applicant: An-Tao Anthony Yang, Burnaby (CA)

(72) Inventor: An-Tao Anthony Yang, Burnaby (CA)

( * ) Notice: Subject to any disclaimer, the term of this patent is extended or adjusted under 35 U.S.C. 154(b) by 239 days.

(21) Appl. No.: 16/432,883

(22) Filed: Jun. 5, 2019

(65) Prior Publication Data
US 2020/0384904 A1 Dec. 10, 2020

(51) Int. Cl.
*B60P 1/02* (2006.01)
*B62D 33/06* (2006.01)
*B62D 61/12* (2006.01)
*B60K 17/22* (2006.01)
*B60K 17/02* (2006.01)
*B60K 17/356* (2006.01)
*F16H 37/04* (2006.01)
*F16H 1/22* (2006.01)
*B60K 17/06* (2006.01)
*B60R 21/34* (2011.01)
*B60R 19/56* (2006.01)

(52) U.S. Cl.
CPC .............. *B60P 1/025* (2013.01); *B60K 17/02* (2013.01); *B60K 17/06* (2013.01); *B60K 17/22* (2013.01); *B60K 17/356* (2013.01); *B60P 1/027* (2013.01); *B62D 33/0617* (2013.01); *B62D 61/12* (2013.01); *F16H 1/22* (2013.01); *F16H 37/04* (2013.01); *B60R 19/565* (2013.01); *B60R 21/34* (2013.01); *B60R 2021/346* (2013.01); *F16H 2702/04* (2013.01)

(58) Field of Classification Search
CPC ...... B60P 1/027; B60P 1/025; B62D 33/0617; B62D 61/12; B62D 33/08; B62D 53/08; B60K 17/22; B60K 17/02; B60K 17/356; B60K 17/06; B60K 17/28; B60K 2025/005; B60K 2001/001; F16H 37/04; F16H 1/22; F16H 2702/04; B60R 21/34; B60R 2021/346; B60R 19/565; A61G 3/066
See application file for complete search history.

(56) References Cited

U.S. PATENT DOCUMENTS

| | | | | | |
|---|---|---|---|---|---|
| 2,299,150 | A | * | 10/1942 | Kennedy | B60P 1/027 180/267 |
| 2,751,234 | A | * | 6/1956 | Couse | B62D 53/0857 280/30 |
| 3,086,619 | A | * | 4/1963 | Grotz | B60T 3/00 188/4 R |
| 3,292,802 | A | * | 12/1966 | Hutchinson | B60S 9/10 414/484 |
| 3,429,585 | A | * | 2/1969 | Ross | B62D 53/065 280/441.2 |
| 3,511,398 | A | * | 5/1970 | Lyster | B62D 53/062 414/460 |
| 3,841,511 | A | * | 10/1974 | Haun | B62D 53/0864 414/499 |
| 3,884,494 | A | * | 5/1975 | Ashby | B62D 53/065 280/442 |
| 3,894,747 | A | * | 7/1975 | Wisdom | B62D 53/062 280/30 |

(Continued)

*Primary Examiner* — Paul N Dickson
*Assistant Examiner* — Timothy Wilhelm

(57) ABSTRACT

Provided is a truck with a lowerable bed for reducing the height difference between the ground and a payload area to provide easy loading and unloading. A traction system for a truck with a lowerable bed is also provided.

16 Claims, 9 Drawing Sheets

(56) References Cited

U.S. PATENT DOCUMENTS

| | | | | |
|---|---|---|---|---|
| 4,261,682 A * | 4/1981 | Papps | B60P 1/38 | 198/813 |
| 4,619,578 A * | 10/1986 | Routledge | B60G 3/14 | 180/41 |
| 4,847,972 A * | 7/1989 | Anderson | A61G 3/066 | 29/401.1 |
| 5,050,897 A * | 9/1991 | Stromberg | B65D 88/121 | 280/43 |
| 5,458,355 A * | 10/1995 | Young | B62D 61/12 | 180/24.02 |
| 5,601,303 A * | 2/1997 | Underwood | B60P 1/027 | 180/9.3 |
| 5,618,151 A * | 4/1997 | Rosenkranz | B62D 31/00 | 414/495 |
| 5,823,629 A * | 10/1998 | Smith | B62D 61/12 | 298/23 R |
| 6,189,901 B1 * | 2/2001 | Smith | B60G 9/00 | 180/209 |
| 6,231,064 B1 * | 5/2001 | Curry | B62D 53/0814 | 280/407 |
| 6,910,844 B2 * | 6/2005 | Trescott | B60P 1/027 | 180/209 |
| 7,731,208 B2 * | 6/2010 | Strong | B62D 61/12 | 280/86.5 |
| 7,740,252 B2 * | 6/2010 | Strong | B62D 61/12 | 280/86.5 |
| 7,775,533 B2 * | 8/2010 | Strong | B62D 61/12 | 280/86.5 |
| 7,841,604 B2 * | 11/2010 | Mitchell | B60D 1/14 | 280/86.5 |
| 8,262,118 B2 * | 9/2012 | Pipe | B62D 53/067 | 280/407 |
| 8,336,905 B1 * | 12/2012 | Mollhagen | B60P 3/04 | 280/656 |
| 8,485,538 B1 * | 7/2013 | Strong | B60G 17/0526 | 280/86.5 |
| 8,784,031 B2 * | 7/2014 | Williams | B65G 67/20 | 414/398 |
| 8,801,036 B2 * | 8/2014 | Keatley | B62D 21/05 | 280/781 |
| 9,260,142 B2 * | 2/2016 | Marcantonio | B62D 53/064 | |
| 9,738,338 B2 * | 8/2017 | Strong | B60G 17/005 | |
| 9,809,074 B2 * | 11/2017 | Strong | B60G 17/005 | |
| 10,023,252 B1 * | 7/2018 | Bjone | B62D 61/12 | |
| 10,449,886 B2 * | 10/2019 | Richardson | B60P 1/38 | |
| 10,479,256 B2 * | 11/2019 | Rezvanian | B60P 1/6445 | |
| 10,882,573 B2 * | 1/2021 | Adachi | B60D 1/015 | |
| 2004/0004333 A1 * | 1/2004 | Riermann | B60P 1/027 | 280/43.17 |
| 2007/0126196 A1 * | 6/2007 | Klahn | B60P 3/40 | 280/86.5 |
| 2012/0032492 A1 * | 2/2012 | Garibotti | B60P 1/027 | 298/17.5 |
| 2013/0285348 A1 * | 10/2013 | Schmitt | B62D 53/0814 | 280/438.1 |
| 2019/0367298 A1 * | 12/2019 | Casanova | B65D 90/0033 | |
| 2020/0079266 A1 * | 3/2020 | Hoehner | B62D 29/02 | |
| 2020/0238884 A1 * | 7/2020 | Behling | B60P 1/027 | |

* cited by examiner

TRUCK WITH LOWERABLE BED

FIELD OF INVENTION

The present invention provides a truck with a lowerable bed, in particular a truck having a driver's cab and a cargo container as two independent compartments.

BACKGROUND

Currently used cargo trucks are mostly based on the body-over-frame construction in which a driver's cab is mounted on a frame towards the front of the vehicle and a cargo container is mounted on the frame and behind the driver's cab.

The frame is supported by a front and a rear axle with a suspension system incorporated into the connecting structure. An engine is mounted on the frame underneath the driver's cab, a transmission is attached to the rear surface of the engine, and a driveshaft connects the transmission to the differential on the rear axle.

In order to overcome the height difference between the ground and the cargo container, a tailgate lift is needed for a loading and an unloading. However, such a method increases the risk of a person falling off the tailgate lift or being crashed by the payload falling off the tailgate lift due to the limited working area on the tailgate lift.

The weight of the tailgate lift also decreases the load carrying capacity, as the tailgate lift is very heavy.

Aside from the added risk, operation of the tailgate lift is also very time consuming due to the limited speed;

Noise generated during operation could also result in noise complaints.

Hoist, fork lift, or loading dock can also be used instead of the tailgate lift.

Nevertheless, these equipment or infrastructure cannot be carried with the truck and is not available at all places.

There are attempts of using such trucks as a flatbed tow truck, in which a guide rail and a winch is installed to slide a flatbed rearward and onto the ground.

After loading and securing a vehicle being towed, the flatbed is then pulled back onto the truck.

Problem to be Solved

The primary objective of the present invention is to provide a truck with a lowerable bed, in which the lowered bed can provide easy access to a cargo holding compartment without the use of a tailgate lift.

The secondary objective of the present invention is to provide a truck with a lowerable bed which minimizes the risk of personal injury due to a person falling off the tailgate lift or the risk of a person getting crashed by a payload falling off the tailgate lift.

It is also an objective of the present invention to provide a truck with a lowerable bed which allows the cargo holding area to be kept leveled throughout a bed lowering process.

It is also an objective of the present invention to provide a truck with a lowerable bed which does not occupy additional area when the bed is lowered.

It is also an objective of the present invention to provide a traction system design for a truck with a lowerable bed.

SUMMARY OF THE INVENTION

Provided in the first embodiment is a truck with a lowerable bed, comprising: a driver's cab, a cargo container, a front axle, a rear axle, a lifting device, and a first guiding device.

Provided in the second embodiment is a truck with a lowerable bed, comprising: a driver's cab, a cargo container, a front axle, a rear axle, a first lifting device, a second lifting device, and a first guiding device.

Provided in the third embodiment is a truck with a lowerable bed, comprising: a driver's cab, a cargo container, a front axle, a rear axle, a first lifting device, a second lifting device, and a first guiding device.

Provided in the fourth embodiment is a truck with a lowerable bed, comprising: a driver's cab, a cargo holding flatbed, a front axle, a rear axle, a first lifting device, a second lifting device, and a first guiding device.

Traction system to be used as part of the rear axle of a truck with a lowerable bed is also provided.

Advantage of Invention

According to the present invention, a safe and efficient loading and unloading of the cargo container is enabled without the use of a tailgate lift, hoist, fork lift, or a loading dock.

Figure 7:
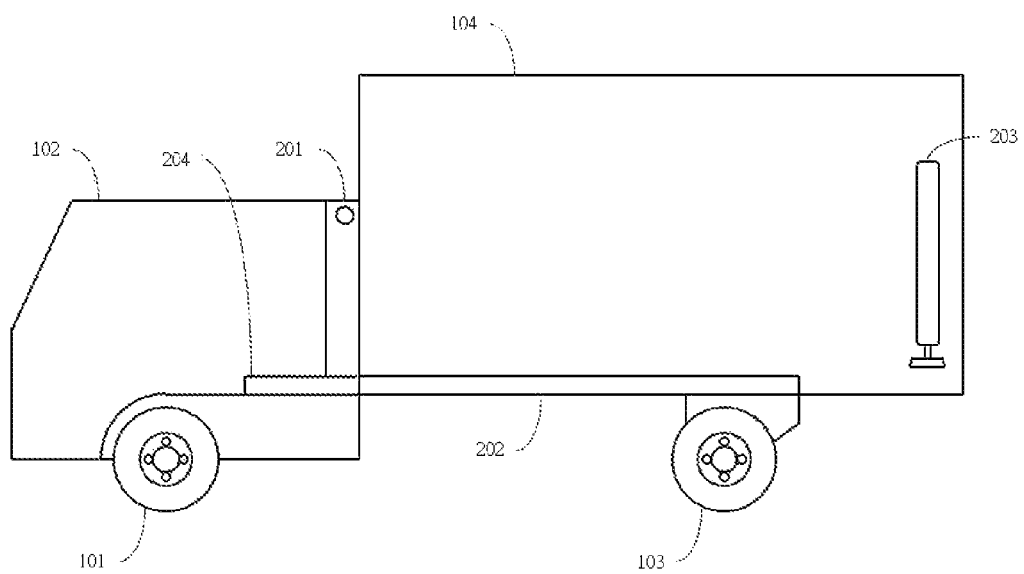
FIG. 7 is a side view of a truck with a lowerable bed according to a third embodiment in a driving mode.

The representative drawing is FIG. 7.

DESCRIPTION

Figure 1:
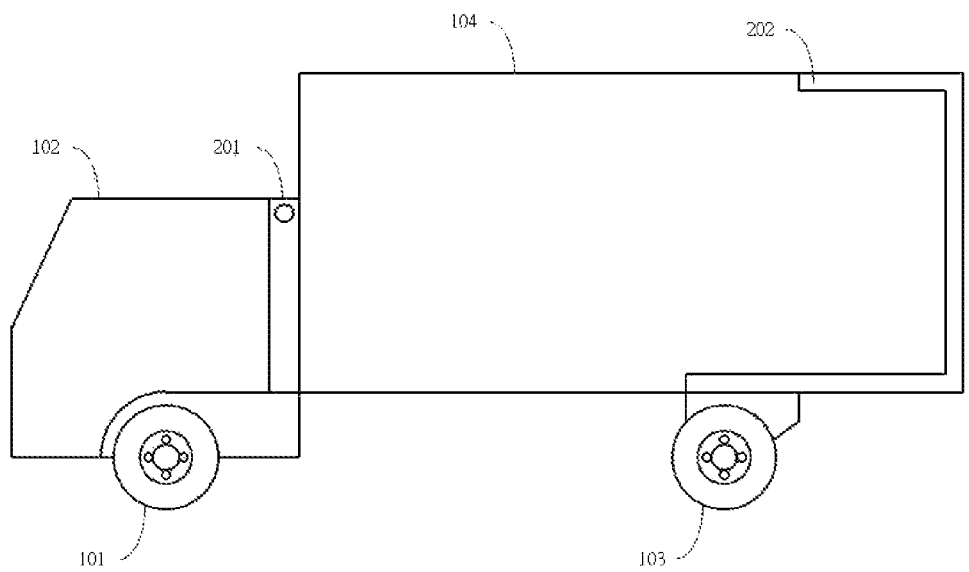
FIG. 1 is a side view of a truck with a lowerable bed according to a first embodiment in a driving mode.

Referring to FIG. 1, a truck with a lowerable bed according to the first embodiment of the present invention comprises a front axle 101, a driver's cab 102, a rear axle 103, a cargo container 104, a first lifting device 201, and a first guiding device 202.

The front axle 101 is attached to the underside of the driver's cab 102, the first lifting device 201 is attached to the driver's cab 102, the cargo container 104 is attached to the first lifting device 201, the first guiding device 202 is attached to the cargo container 104, and the rear axle 103 is slidingly attached to the first guiding device 202.

The first lifting device 201 enables a controlled sliding movement between the driver's cab 102 and the cargo container 104 in the vertical direction; when the first lifting device 201 is extended, the cargo container 104 is moved upward, and when the first lifting device 201 is retracted, the cargo container 104 is moved downward. The truck has three configurations which are referred as the driving mode, the side-loading mode, and the rear-loading mode.

The driving mode is used for the movement of the truck, the side-loading mode is used for loading and unloading through a hatch installed on the side of the cargo container 104, and the rear-loading mode is used for loading and unloading through a hatch installed on the rear of the cargo container 104.

Referring to FIG. 1, when the truck is in the driving mode, the rear axle 103 moves to a position under the cargo container 104 along the first guiding device 202, and the cargo container 104 is held in the highest position by extending the first lifting device 201.

Figure 2:
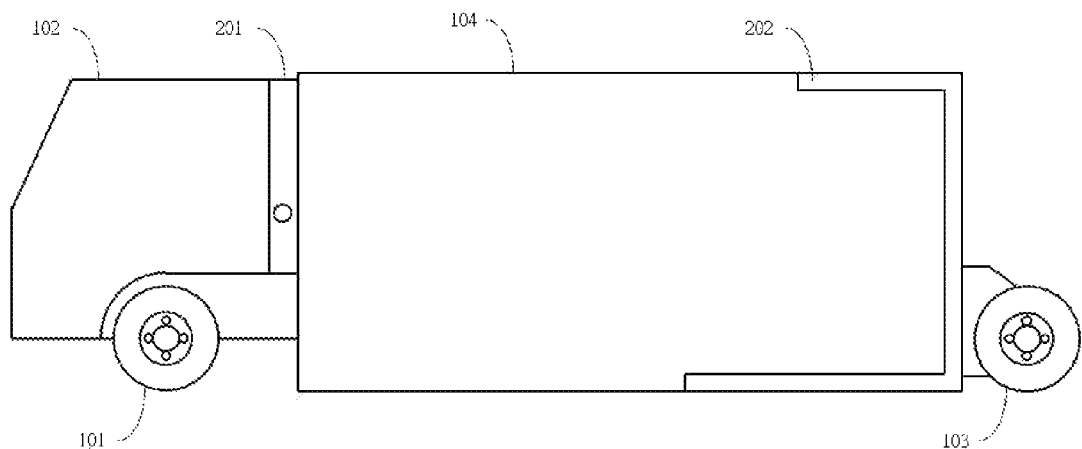
FIG. 2 is a side view of a truck with a lowerable bed according to the first embodiment in a side-loading mode.

Referring to FIG. 2, when the truck is in the side-loading mode, with which loading and unloading through a hatch installed on the side of the cargo container 104 is desired, the rear axle 103 moves to a position rear of the cargo container 104 along the first guiding device 202, and the cargo container 104 is lowered to the ground by the first lifting device 201.

Figure 3:
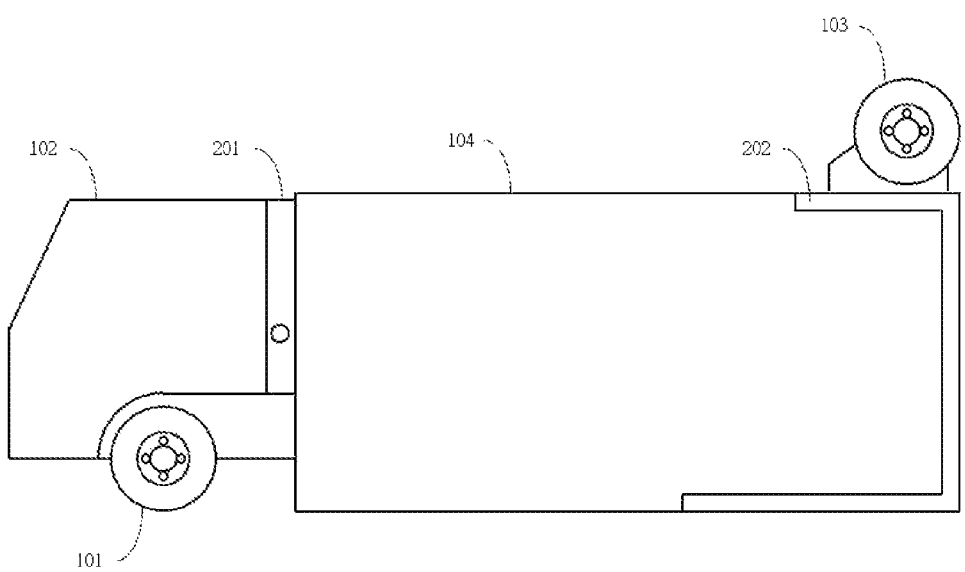
FIG. 3 is a side view of a truck with a lowerable bed according to the first embodiment in a rear-loading mode.

Referring to FIG. 3, when the truck is in the rear-loading mode, with which loading and unloading through a hatch installed on the rear of the cargo container 104 is desired, the rear axle 103 moves to a position above the cargo container 104 along the first guiding device 202, and the cargo container 104 is lowered onto the ground by the first lifting device 201.

A retractable side guard, not shown in the drawings, is also attached under the cargo container 104 to prevent cyclists, pedestrians, and motorcyclists from going under the truck bed during a collision.

The retractable side guard will retract before the cargo container 104 is lowered onto the ground.

Figure 4:
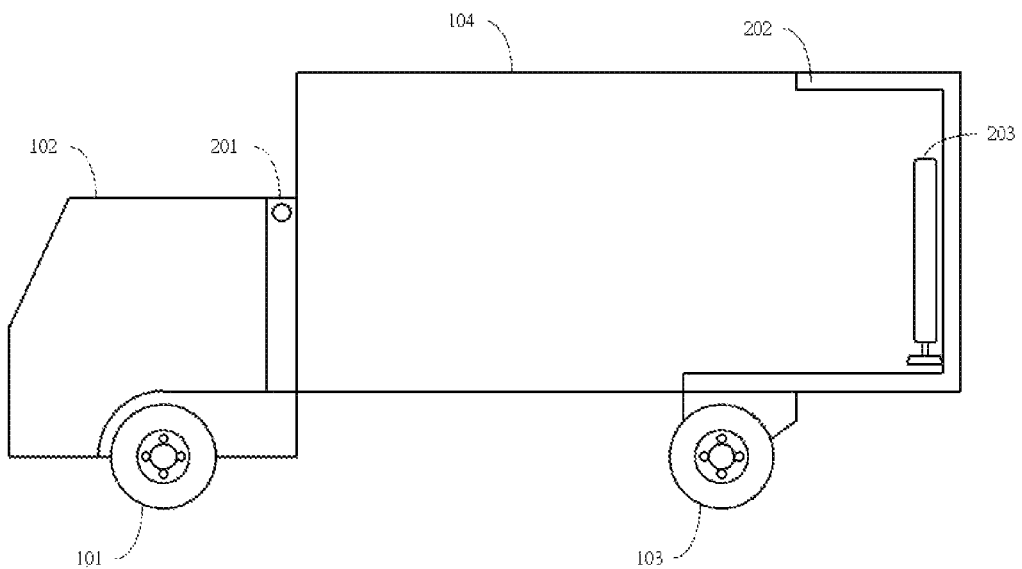
FIG. 4 is a side view of a truck with a lowerable bed according to a second embodiment in a driving mode.

Referring to FIG. 4, a truck with a lowerable bed according to the second embodiment of the present invention comprises a front axle 101, a driver's cab 102, a rear axle 103, a cargo container 104, a first lifting device 201, a first guiding device 202, and a second lifting device 203.

The front axle 101 is attached to the underside of the driver's cab 102, the first lifting device 201 is attached to the driver's cab 102, the cargo container 104 is attached to the first lifting device 201, the first guiding device 202 is attached to the cargo container 104, the rear axle 103 is slidingly attached to the first guiding device 202, and the second lifting device 203 is attached to the rear of the cargo container 104.

The first lifting device 201 enables a controlled sliding movement between the driver's cab 102 and the cargo container 104 in the vertical direction; when the first lifting device 201 is extended, the cargo container 104 is moved upward, and when the first lifting device 201 is retracted, the cargo container 104 is moved downward.

The first guiding device 202 enables a controlled movement of the rear axle 103 along the first guiding device 202, and the second lifting device 203 is used for supporting the cargo container 104 during rear axle 103 movement and to keep the cargo container 104 leveled.

The truck has three configurations which are referred as the driving mode, the side-loading mode, and the rear-loading mode.

The driving mode is used for the movement of the truck, the side-loading mode is used when loading and unloading through a hatch installed on the side of the cargo container 104, and the rear-loading mode is used for loading and unloading through a hatch installed on the rear of the cargo container 104.

Referring to FIG. 4, when the truck is in the driving mode, the rear axle 103 moves to a position under the cargo container 104 along the first guiding device 202, the cargo container 104 is held in the highest position by extending the first lifting device 201, and the second lifting device 203 is in the retracted position.

Figure 5:
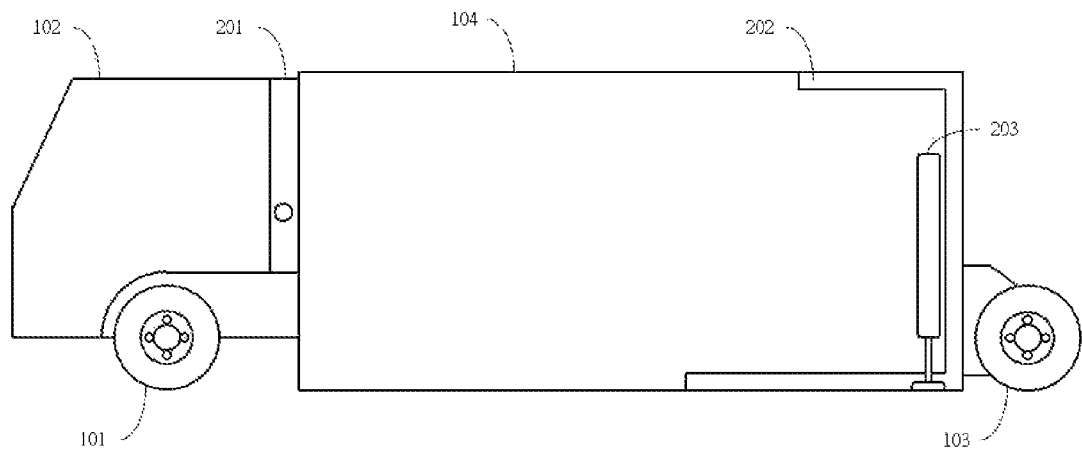
FIG. 5 is a side view of a truck with a lowerable bed according to the second embodiment in a side-loading mode.

Referring to FIG. 5, when the truck is in the side-loading mode, with which loading and unloading through a hatch installed on the side of the cargo container 104 is desired. The second lifting device 203 is first extended to bear the weight of the cargo container 104, the rear axle 103 then moves to a position rear of the cargo container 104 along the first guiding device 202, and the cargo container 104 is then lowered onto the ground by retracting the first lifting device 201 and the second lifting device 203 at the same rate.

Figure 6:
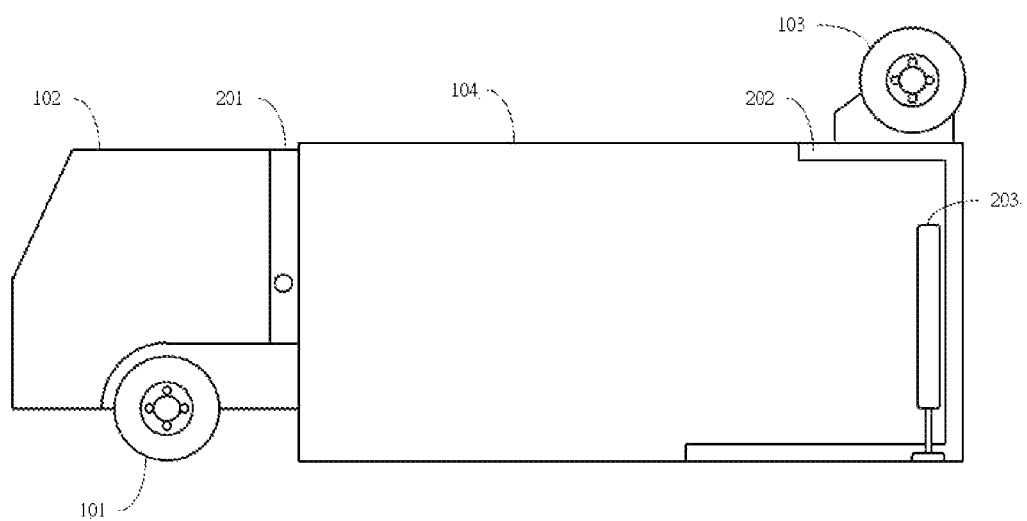
FIG. 6 is a side view of a truck with a lowerable bed according to the second embodiment in a rear-loading mode.

Referring to FIG. 6, when the truck is in the rear-loading mode, with which loading and unloading through a hatch installed on the rear of the cargo container 104 is desired.

The truck is first configured into the side-loading mode, and the rear axle 103 moves to a position above the cargo container 104 along the first guiding device 202.

A retractable side guard, not shown in the drawings, is also attached under the cargo container 104 to prevent cyclists, pedestrians, and motorcyclists from going under the truck bed during a collision.

The retractable side guard will retract before the cargo container 104 is lowered onto the ground.

Referring to FIG. 7, a truck with a lowerable bed according to the third embodiment of the present invention comprises a front axle 101, a driver's cab 102, a rear axle 103, a cargo container 104, a first lifting device 201, a first guiding device 202, a second guiding device 204, and a second lifting device 203. The front axle 101 and the second guiding device 204 are attached to the underside of the driver's cab 102, the first lifting device 201 is attached to the driver's cab 102, the cargo container 104 is attached to the first lifting device 201, the first guiding device 202 is attached to the cargo container 104, the rear axle 103 is slidingly attached to the first guiding device 202, and the second lifting device 203 is attached to the rear of the cargo container 104.

The first lifting device 201 enables a controlled sliding movement between the driver's cab 102 and the cargo container 104 in the vertical direction.

When the first lifting device 201 is extended, the cargo container 104 is moved upward, and when the first lifting device 201 is retracted, the cargo container 104 is moved downward.

When the first lifting device 201 is in the most extended position, the first guiding device 202 and the second guiding device 204 are aligned, and the rear axle 103 can move back and forth between the first guiding device 202 and the second guiding device 204.

The second lifting device 203 is used for supporting the cargo container 104 during rear axle 103 movement and to keep the cargo container 104 level.

The truck has two configurations which are referred as the driving mode and the loading mode.

The driving mode is used for the movement of the truck, and the loading mode is used for loading and unloading of the truck.

Referring to FIG. 7, when the truck is in the driving mode, the rear axle 103 moves to a position under the cargo container 104 along the first guiding device 202, the cargo container 104 is held in the highest position by extending the first lifting device 201, and the second lifting device 203 is in the retracted position.

Figure 8:
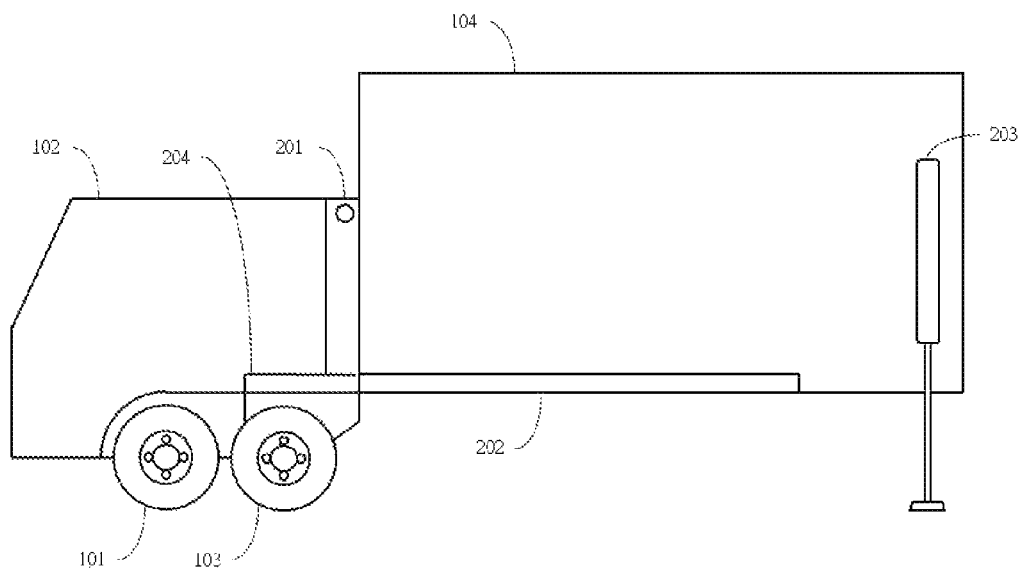
FIG. 8 is a side view of a truck with a lowerable bed according to the third embodiment during mode change.

Referring to FIG. 8, when the truck is performing a mode change, from the driving mode to the loading mode, the second lifting device 203 is extended to bear the weight of the cargo container 104, and the cargo container 104 is held in the top position by the first lifting device 201 so that the first guiding device 202 and the second guiding device 204 is aligned.

The rear axle 103 is then moved forward along the first guiding device 202 and onto the second guiding device 204 to a new position under the driver's cab 102.

Figure 9:
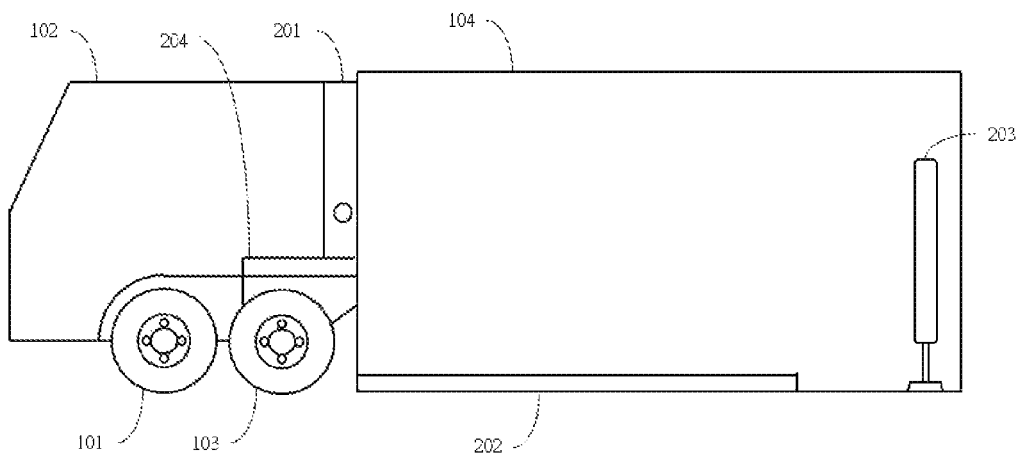
FIG. 9 is a side view of a truck with a lowerable bed according to the third embodiment in a loading mode.

Referring to FIG. 9, the cargo container 104 is then lowered onto the ground by retracting the first lifting device 201 and the second lifting device 203 at the same rate.

A retractable side guard, not shown in the drawings, is also attached under the cargo container 104 to prevent cyclists, pedestrians, and motorcyclists from going under the truck bed during a collision.

The retractable side guard will retract before the cargo container 104 is lowered onto the ground.

Figure 10:
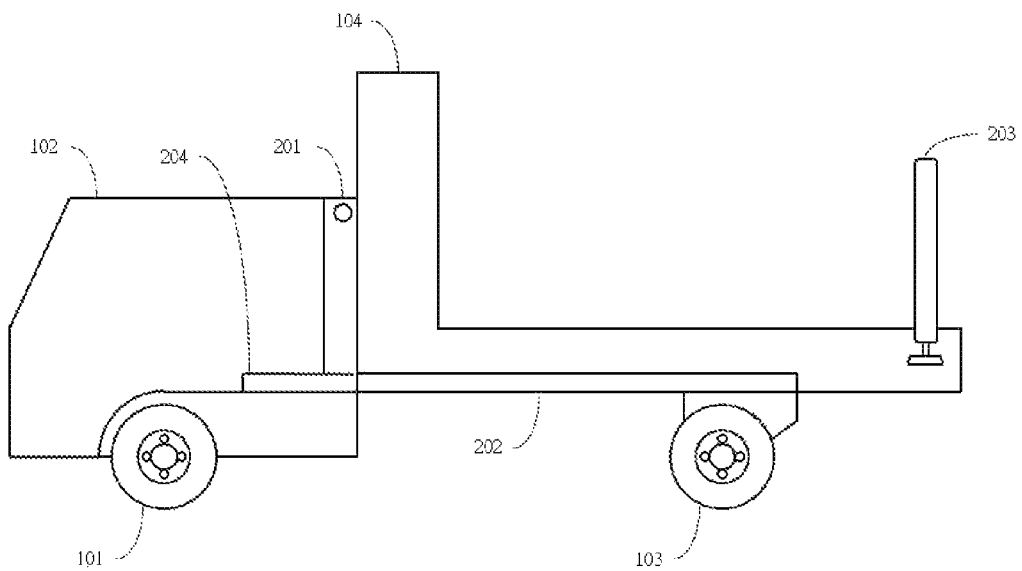
FIG. 10 is a side view of a truck with a lowerable bed according to a fourth embodiment in a driving mode.

Referring to FIG. 10, a truck with a lowerable bed according to the third embodiment of the present invention comprising a front axle 101, a driver's cab 102, a rear axle 103, a flatbed 105, a first lifting device 201, a first guiding device 202, a second guiding device 204, and a second lifting device 203. The front axle 101 and the second guiding device 204 are attached to the underside of the driver's cab 102, the first lifting device 201 is attached to the driver's cab 102, the flatbed 105 is attached to the first lifting device 201, the first guiding device 202 is attached to the flatbed 105, the rear axle 103 is slidingly attached to the first guiding device 202, and the second lifting device 203 is attached to the rear of the flatbed 105.

The first lifting device 201 enables a controlled sliding movement between the driver's cab 102 and the flatbed 105 in the vertical direction.

When the first lifting device 201 is extended, the flatbed 105 is moved upward.

When the first lifting device 201 is retracted, the flatbed 105 is moved downward.

When the first lifting device 201 is in the most extended position, the first guiding device 202 and the second guiding device 204 are aligned, and the rear axle 103 can move back and forth between the first guiding device 202 and the second guiding device 204. The second lifting device 203 is used for supporting the flatbed 105 during rear axle 103 movement and to keep the flatbed 105 leveled.

The truck has two configurations which are referred as the driving mode and the loading mode.

Driving mode is used for the movement of the truck, and the loading mode is used for loading and unloading of the truck.

Referring to FIG. 10, when the truck is in the driving mode, the rear axle 103 moves to a position under the flatbed 105 along the first guiding device 202, the flatbed 105 is held in the highest position by extending the first lifting device 201, and the second lifting device 203 is in the retracted position.

Figure 11:
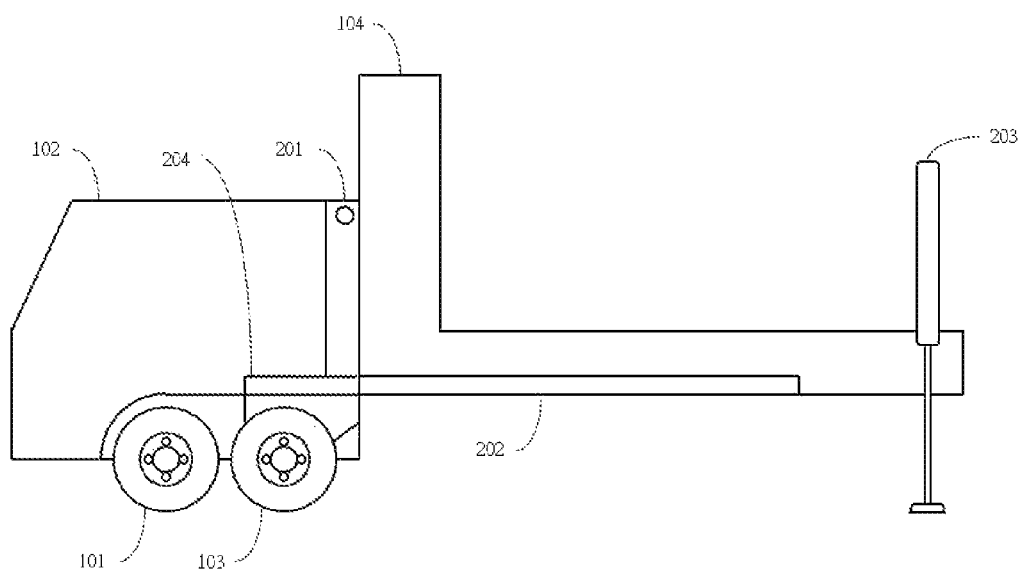
FIG. 11 is a side view of a truck with a lowerable bed according to the fourth embodiment during mode change.

Referring to FIG. 11, when the truck is performing a mode change, from the driving mode to the loading mode, the second lifting device 203 is extended to bear the weight of the flatbed 105, the flatbed 105 is held in the top position by the first lifting device 201 so that the first guiding device 202 and the second guiding device 204 is aligned.

The rear axle 103 is then moved forward along the first guiding device 202 and onto the second guiding device 204 to a new position under the driver's cab 102.

Figure 12:
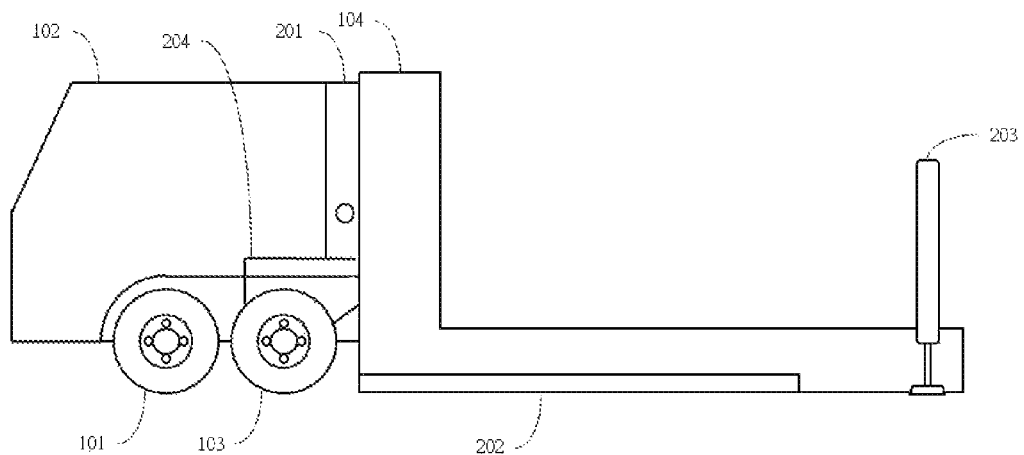
FIG. 12 is a side view of a truck with a lowerable bed according to the fourth embodiment in a loading mode.

Referring to FIG. 12, the flatbed 105 is then lowered onto the ground by retracting the first lifting device 201 and the second lifting device 203 at the same rate.

An extension device could also be fitted between the second lifting device 203 and the flatbed 105 for moving the second lifting device 203 transversely, so the second lifting device 203 does not hinder the loading and unloading.

A retractable side guard, not shown in the drawings, is also attached under the flatbed 105 to prevent cyclists, pedestrians, and motorcyclists from going under the truck bed during a collision.

The retractable side guard will retract before the flatbed 105 is lowered onto the ground.

Referring to FIG. 13 to FIG. 17, traction systems is also provided as part of the rear axle for a truck according to the first, second, third, or fourth embodiment; additional components, such as: suspension linkage, shock absorber, spring, and brake system, that are commonly known by the person of ordinary skill in the art are not within the scope of the present invention and therefore not mentioned.

Figure 13:
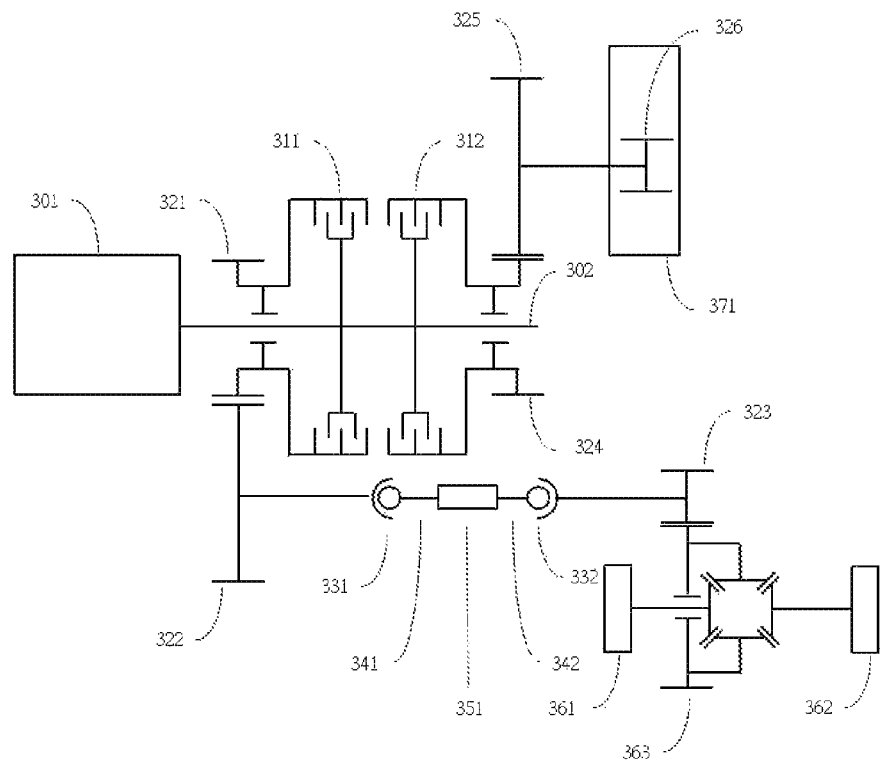
FIG. 13 is a schematic view of a first traction system for a truck with a lowerable bed.

Referring to FIG. 13, a first traction system for a truck with a lowerable bed, comprises: a motor 301, a motor output shaft 302, a first clutch 311, a second clutch 312, a first gear 321, a second gear 322, a third gear 323, a fourth gear 324, a fifth gear 325, a pinion 326, a first CV joint 331, a second CV joint 332, a first drive shaft 341, a second drive shaft 342, a first telescopic shaft 351, a first drive wheel 361, a second drive wheel 362, a differential 363, and a first rack 371.

The motor output shaft 302 is rotatably attached to the motor 301, the first clutch 311 and the second clutch 322 is attached to the motor output shaft 302, the first gear 321 is coaxially attached to the first clutch 311 and is meshing with the second gear 322.

The first CV joint 331 is attached to the second gear 322, the first drive shaft 341 is attached to the first CV joint 331, the first telescopic shaft 351 is attached to the first drive shaft 341, the second drive shaft 342 is attached to the first telescopic shaft 351, and the second CV joint 332 is attached to the second drive shaft 342.

The third gear 323 is attached to the second CV joint 332 and is meshing with the differential 363.

The first drive wheel 361 and the second drive wheel 362 are attached to the differential 363.

The fourth gear 324 is attached to the second clutch 312 and is meshing with the fifth gear 325.

The pinion 326 is attached to the fifth gear and is meshing with the rack 371.

When the first clutch 311 is engaged and the second clutch 312 is released, torque output from the motor 301 is transmitted to the first drive wheel 361 and the second drive wheel 362; the torque from the motor 301 is used to propel the truck.

Referring to FIG. 1, FIG. 4, and FIG. 13, when the first traction system is used in conjunction with a truck according to the first embodiment or a truck according to the second embodiment, the rack 371 is attached to the first guiding device 202.

When the first clutch 311 is released and the second clutch 312 is engaged, torque output from the motor 301 is transmitted to the pinion 326 which cause the rear axle 103 to move along the first guiding device 202.

Referring to FIG. 7, FIG. 10, and FIG. 13, when the first traction system is used in conjunction with a truck according to the third embodiment or a truck according to the fourth embodiment, the rack 371 is divided into two section in which a first section of the rack 371 is attached to the first guiding device 202 and a second section of the rack 371 is attached to the second guiding device 204.

When the first clutch 311 is released and the second clutch 312 is engaged, torque output from the motor 301 is transmitted to the pinion 326 which cause the rear axle 103 to move along the first guiding device 202 or the second guiding device 204.

Figure 14:
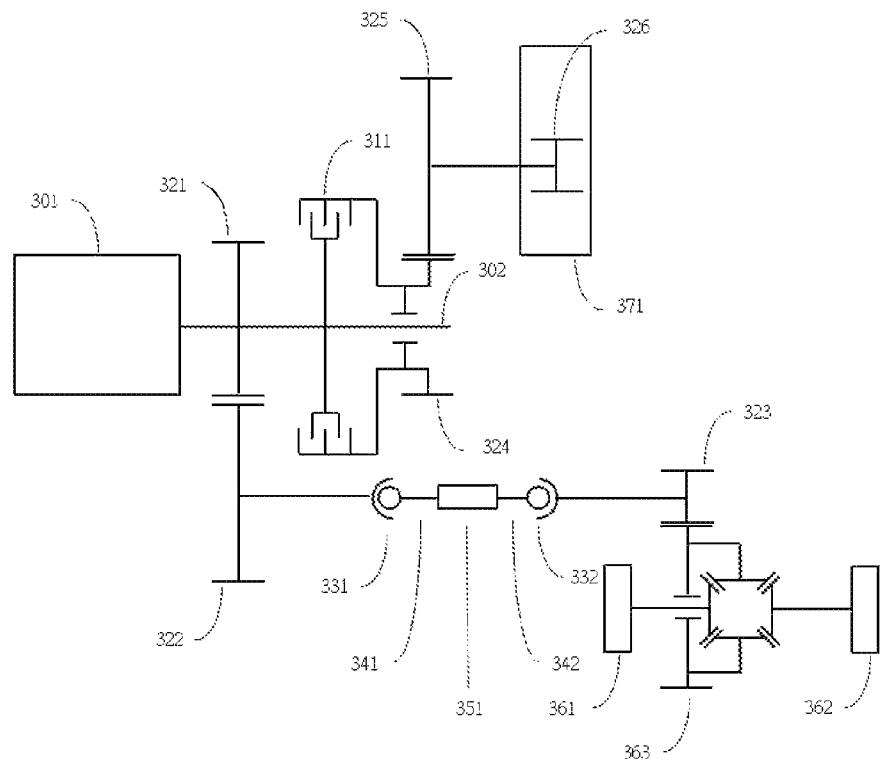
FIG. 14 is the schematic view of a second traction system for a truck with a lowerable bed.

Referring to FIG. 14, a second traction system for a truck with a lowerable bed comprises: a motor 301, a motor output shaft 302, a first clutch 311, a first gear 321, a second gear 322, a third gear 323, a fourth gear 324, a fifth gear 325, a pinion 326, a first CV joint 331, a second CV joint 332, a first drive shaft 341, a second drive shaft 342, a first telescopic shaft 351, a first drive wheel 361, a second drive wheel 362, a differential 363, and a first rack 371.

The motor output shaft 302 is rotatably attached to the motor 301, the first clutch 311 and the first gear 321 is attached to the motor output shaft 302, the first gear 321 is meshing with the second gear 322. The first CV joint 331 is attached to the second gear 322, the first drive shaft 341 is attached to the first CV joint 331, the first telescopic shaft 351 is attached to the first drive shaft 341, the second drive shaft 342 is attached to the first telescopic shaft 351, and the second CV joint 332 is attached to the second drive shaft 342.

The third gear 323 is attached to the second CV joint 332 and is meshing with the differential 363.

The first drive wheel 361 and the second drive wheel 362 is attached to the differential 363. The fourth gear 324 is attached to the first clutch 311 and is meshing with the fifth gear 325. The pinion 326 is attached to fifth gear and is meshing with the rack 371.

When the first clutch 311 is released, torque output from the motor 301 is transmitted to the first drive wheel 361 and the second drive wheel 362; the torque from the motor 301 is used to propel the truck.

Referring to FIG. 1, FIG. 4, and FIG. 14, when the second traction system is used in conjunction with a truck according to the first embodiment or a truck according to the second embodiment, the rack 371 is attached to the first guiding device 202.

When the first clutch 311 is engaged, torque output from the motor 301 is transmitted to the first drive wheel 361, the second drive wheel 362 and the pinion 326, which cause the rear axle 103 to move along the first guiding device 202.

The gear ratio between the first gear 321, the second gear 322, the third gear 323, the fourth gear 324, the fifth gear 325, the pinion 326, the rack 371 and the differential 363 is matched with the dimension of the first drive wheel 361 and the second drive wheel 362, so the movement of the pinion 326 on the rack 371 is at the same rate as the movement of the first drive wheel 361 and the second drive wheel 362 on the ground.

Referring to FIG. 7, FIG. 10, and FIG. 14, when the second traction system is used in conjunction with a truck according to the third embodiment or a truck according to the fourth embodiment, the rack 371 is divided into two section in which a section of the rack 371 is attached to the first guiding device 202 and a second section of the rack 371 is attached to the second guiding device 204.

When the first clutch 311 is engaged, torque output from the motor 301 is transmitted to the first drive wheel 361, the second drive wheel 362, and the pinion 326, which cause the rear axle 103 to move along the first guiding device 202 or the second guiding device 204.

The gear ratio between the first gear 321, the second gear 322, the third gear 323, the fourth gear 324, the fifth gear 325, the pinion 326, the rack 371 and the differential 363 is matched with the dimension of the first drive wheel 361 and the second drive wheel 362, so the movement of the pinion 326 on the rack 371 is at the same rate as the movement of the first drive wheel 361 and the second drive wheel 362 on the ground.

Figure 15:
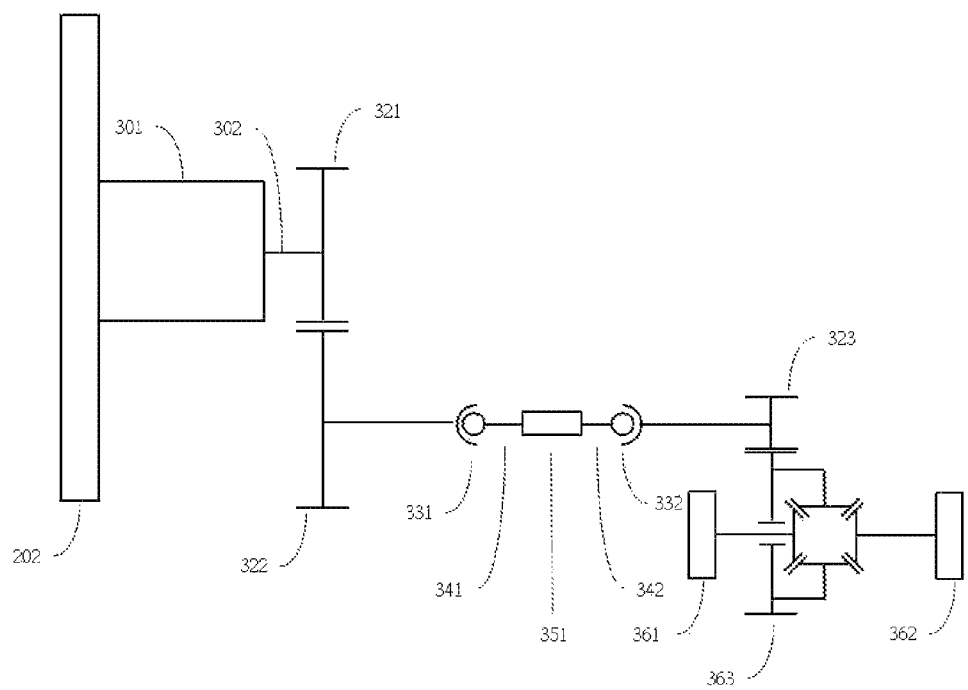
FIG. 15 is a schematic view of a third traction system for a truck with a lowerable bed.
Figure 16:
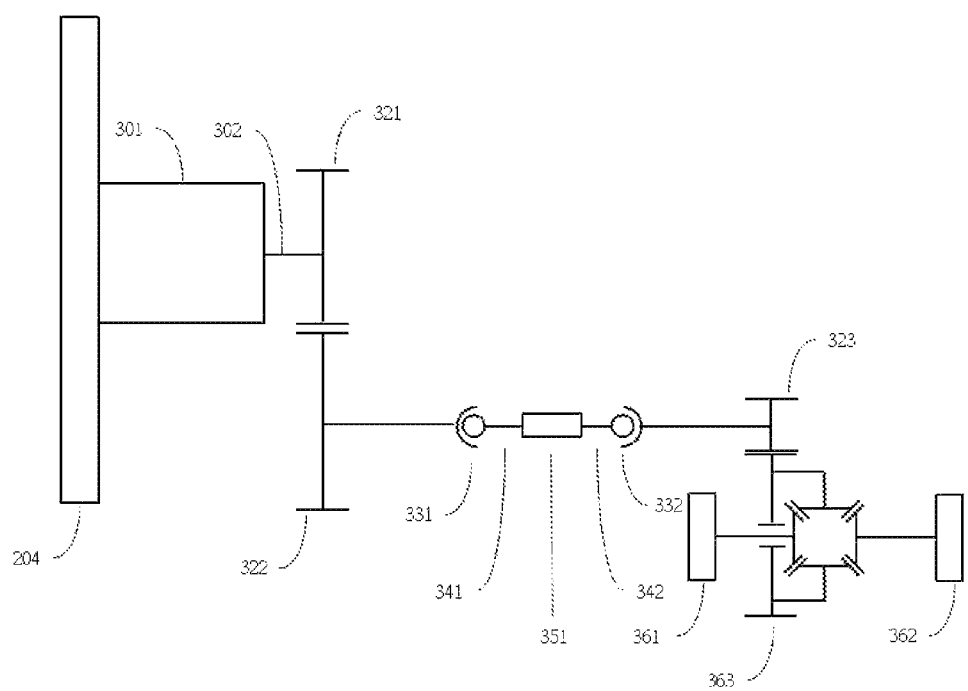
FIG. 16 is a schematic view of a third traction system for a truck with a lowerable bed.

Referring to FIG. 15 and FIG. 16, a third system for a truck with a lowerable bed comprises: a motor 301, a motor output shaft 302, a first gear 321, a second gear 322, a third gear 323, a first CV joint 331, a second CV joint 332, a first drive shaft 341, a second drive shaft 342, a first telescopic shaft 351, a first drive wheel 361, a second drive wheel 362, and a differential 363.

The motor output shaft 302 is rotatably attached to the motor 301, the first gear 321 is attached to the motor output shaft 302 and is meshing with the second gear 322.

The first CV joint 331 is attached to the second gear 322, the first drive shaft 341 is attached to the first CV joint 331, the first telescopic shaft 351 is attached to the first drive shaft 341, the second drive shaft 342 is attached to the first telescopic shaft 351, and the second CV joint 332 is attached to the second drive shaft 342.

The third gear 323 is attached to the second CV joint 332 and is meshing with the differential 363.

The first drive wheel 361 and the second drive wheel 362 is attached to the differential 363.

A first actuator 381 is attached to the motor 301 for a controlled movement of the motor 301.

Referring to FIG. 7, FIG. 10, FIG. 15 and FIG. 16, when the third traction system is used in conjunction with a truck according to the third embodiment or a truck according to the fourth embodiment, the motor 301 is slidingly attached to the first guiding device 202, and a locking device, not shown in the drawings, is fitted inside the first guiding device 202.

The locking device can be clamps, locking pins, or retractable bump stops.

During the driving mode, the locking device inside the first guiding device 202 locks the motor 301 in a position under the cargo container 104 or the flatbed 105, and the torque output from the motor 301 is transmitted to the first drive wheel 361 and the second drive wheel 362.

The torque from the motor 301 is used to propel the truck.

When the truck is performing a mode change, from driving mode to loading mode, the second lifting device 203 is extended to bear the weight of the cargo container 104 or the flatbed 105, the cargo container 104 or the flatbed 105 is held in the top position by the first lifting device 201 so that the first guiding device 202 and the second guiding device 204 are aligned.

The brake is applied on the front axle 101, and the locking device inside the first guiding device 202 releases, allowing the rear axle 103 to move freely.

The torque output from the motor 301 is then transmitted to the first drive wheel 361 and the second drive wheel 362, causing the rear axle 103 to move forward. The rear axle 103 then moves forward along the first guiding device 202 and onto the second guiding device 204 to a new position under the driver's cab 102.

The first lifting device 201 and the second lifting device 203 are then retraced in the same rate.

Figure 17:
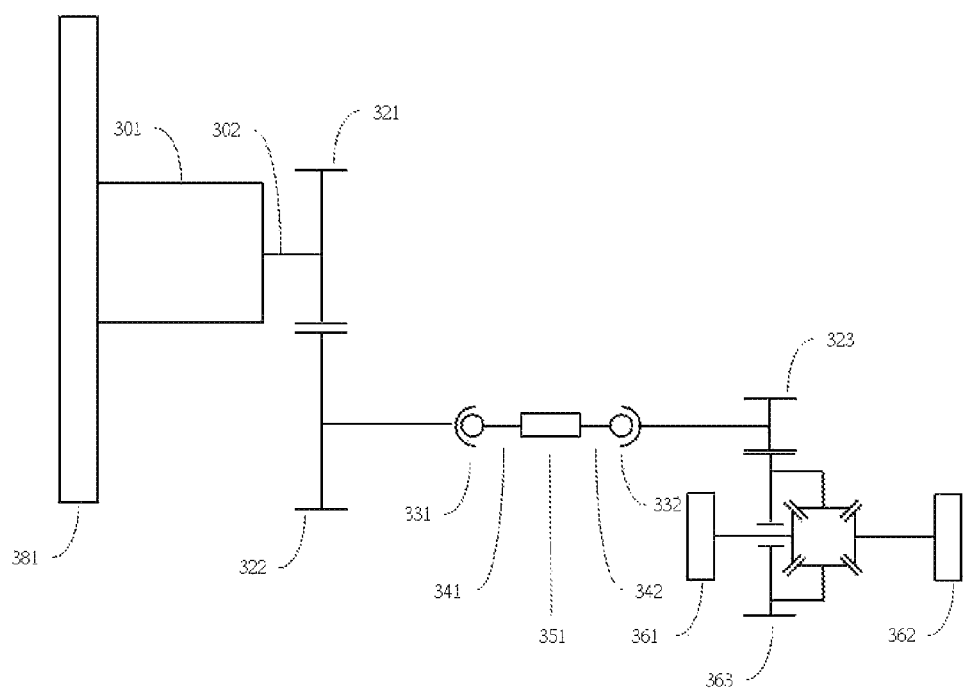
FIG. 17 is a schematic view of a fourth traction system for a truck with a lowerable bed.

Referring to FIG. 17, a fourth traction system for a truck with a lowerable bed comprises: a motor 301, a motor output shaft 302, a first gear 321, a second gear 322, a third gear 323, a first CV joint 331, a second CV joint 332, a first drive shaft 341, a second drive shaft 342, a first telescopic shaft 351, a first drive wheel 361, a second drive wheel 362, a differential 363, and a first actuator 381.

The motor output shaft 302 is rotatably attached to the motor 301, the first gear 321 is attached to the motor output shaft 302 and is meshing with the second gear 322.

The first CV joint 331 is attached to the second gear 322, the first drive shaft 341 is attached to the first CV joint 331, the first telescopic shaft 351 is attached to the first drive shaft 341, the second drive shaft 342 is attached to the first telescopic shaft 351, and the second CV joint 332 is attached to the second drive shaft 342.

The third gear 323 is attached to the second CV joint 332 and is meshing with the differential 363. The first drive wheel 361 and the second drive wheel 362 are attached to the differential 363. The first actuator 381 is attached to the motor 301 for a controlled movement of the motor 301.

When the motor 301 is held in place by the first actuator 381, torque output from the motor 301 is transmitted to the first drive wheel 361 and the second drive wheel 362; the torque from the motor 301 is used to propel the truck.

Referring to FIG. 1, FIG. 4, FIG. 7, FIG. 10, and FIG. 17, when the fourth traction system is used in conjunction with the truck according to the first embodiment, the truck according to the second embodiment, the truck according to the third embodiment, or the truck according to the fourth embodiment, the first actuator 381 is attached to the first guiding device 202, enabling a controlled movement of the rear axle 103.

The first actuator 381 can be a hydraulic actuator, a linear motor, a sprocket and a chain, or a rack and a pinion.

What is claimed is:

1. A truck with a lowerable bed comprising:
    a driver's cab, a cargo container, a front axle, a rear axle, at least one lifting device, and at least one guiding device;
    wherein, said front axle is attached to said driver's cab, wherein said driver's cab is attached to the said lifting device, wherein said lifting device is attached to said cargo container, wherein said cargo container is attached to said guiding device, wherein said guiding device is attached to said rear axle;
    wherein said truck includes three selectable modes, wherein the three selectable mode includes a driving mode, a side-loading mode and a rear-loading mode;
    wherein, when said driving mode is selected, said front axle is positioned under said driver's cab, said rear axle is positioned under said cargo container, and said driver's cab is positioned in front of said cargo container;
    wherein, when said side-loading mode is selected, said rear axle moves along said guiding device and is positioned rear of said cargo container, and said cargo container is lowered onto the ground through actuation of said lifting device and movement of said rear axle,
    wherein, when said rear-loading mode is selected, said truck first enters said side-loading mode, said rear axle is then moved above said cargo container.

2. The truck with a lowerable bed as claimed in claim 1, further comprising:
    a second lifting device,
    wherein said second lifting device is attached to a rear portion of said cargo container to support said cargo container during said rear axle movement and vertical movement of said cargo container.

3. The truck with lowerable bed as claimed in claim 2,
    wherein said rear axle comprising: a motor, a motor output shaft, a first clutch, a second clutch, a first gear, a second gear, a third gear, a first CV joint, a second CV joint, a telescopic shaft, a first drive wheel, a second drive wheel, a differential, a pinion, and a rack;
    wherein said motor output shaft is rotatably attached to said motor,
    wherein said first clutch and said second clutch are attached to said motor output shaft,
    wherein said first gear is attached to said first clutch and is meshing with said second gear,
    wherein said second gear is connected to said first CV joint,
    wherein said first CV joint is connected to said telescopic shaft,
    wherein said telescopic shaft is connected to said second CV joint,
    wherein said second CV joint is connected to said third gear,
    wherein said third gear is connected to said differential,
    wherein said first drive wheel and said second drive wheel are connected to said differential,
    wherein said pinion is attached to said second clutch and is meshing with said rack,
    wherein said rack is attached to said cargo container,
    wherein, when said first clutch is engaged and said second clutch is released, output torque of said motor is transmitted to said first drive wheel and said second drive wheel to propel said truck,
    wherein, when said first clutch is released and said second clutch is engaged, output torque of said motor is transmitted to said pinion to cause a movement between said rear axle and said cargo container.

4. The truck with lowerable bed as claimed in claim 2,
    wherein said rear axle comprising:
    a motor, a motor output shaft,
    a first clutch,
    a first gear, a second gear, a third gear,
    a first CV joint, a second CV joint,
    a telescopic shaft,
    a first drive wheel, a second drive wheel,
    a differential, a pinion and a rack;
    wherein said motor output shaft is rotatably attached to said motor,
    wherein said first clutch and said first gear is attached to said motor output shaft,
    wherein said first gear meshing with said second gear,
    wherein said second gear is connected to said first CV joint,
    wherein said first CV joint is connected to said telescopic shaft,
    wherein said telescopic shaft is connected to said second CV joint,
    wherein said second CV joint is connected to said third gear, wherein said third gear is connected to said differential,
wherein said first drive wheel and said second drive wheel are connected to said differential,
wherein said pinion is attached to said first clutch and is meshing with said rack,
wherein said rack is attached to said cargo container;
wherein, when said first clutch is released, output torque of said motor is transmitted to said first drive wheel and said second drive wheel to propel said truck,
wherein, when said first clutch is engaged, the output torque of said motor is transmitted to said first drive wheel, said second drive wheel and to said pinion to cause a movement between said rear axle and said cargo container.

5. The truck with lowerable bed as claimed in claim 1,
wherein a retractable side guard is attached to said cargo container.

6. A truck with lowerable bed comprising:
a driver's cab, a cargo container, a front axle, a rear axle, a first lifting device, a second lifting device, and a first guiding device;
wherein said front axle is attached to said driver's cab, wherein said driver's cab is attached to the said first lifting device, wherein said first lifting device and said second lifting device are attached to said cargo container, wherein said cargo container is attached to said first guiding device, wherein said first guiding device is attached to said rear axle;
wherein said truck includes two selectable modes, wherein the two selectable modes includes a driving mode and a loading mode;
wherein, when said driving mode is selected, said front axle is positioned under said driver's cab, said rear axle is positioned under said cargo container, and said driver's cab is positioned in front of said cargo container;
wherein, when said loading mode is selected, said second lifting device extends to support said cargo container, said rear axle then moves forward along said first guiding device to a position under of said driver's cab, said cargo container is then lowered onto the ground by actuating said first lifting device and said second lifting device.

7. The truck with lowerable bed as claimed in claim 6, further comprising:
a second guiding device;
wherein said second guiding device is attached to said driver's cab;
wherein, when said loading mode is selected, said rear axle moves forward along said first guiding device onto said second guiding device to a position under said driver's cab.

8. The truck with lowerable bed as claimed in claim 7,
wherein said first guiding device further comprises a locking means to prevent relative movement between said rear axle and said cargo container;
wherein said rear axle comprising: a motor, a torque transmission means, a first drive wheel, a second drive wheel, and a differential;
wherein torque of said motor is transmitted to said differential through said torque transmission means;
wherein said first drive wheel and said second drive wheel are attached to said differential;
wherein, when said locking means is engaged, output torque of said motor is transmitted to said first drive wheel and said second drive wheel to propel said truck;
wherein, when said locking means is released, the output torque of said motor is transmitted to said first drive wheel and said second drive wheel to cause a relative movement between said rear axle and said cargo container along said first guiding device and onto said second guiding device.

9. The truck with lowerable bed as claimed in claim 8,
wherein said locking means is a clamp, a locking pin, or a retractable bump stop.

10. The truck with lowerable bed as claimed in claim 8,
wherein said torque transmission means is a reduction gear or a shaft.

11. The truck with lowerable bed as claimed in claim 7,
wherein said first guiding device further comprises an actuating means to control the relative movement between said rear axle and said cargo container.

12. The truck with lowerable bed as claimed in claim 11,
wherein said rear axle comprising: a motor, a torque transmission means, a first drive wheel, a second drive wheel, and a differential;
wherein torque of said motor is transmitted to said differential through said torque transmission means,
wherein said first drive wheel and said second drive wheel are attached to said differential,
wherein output torque of said motor is used to propel said truck.

13. The truck with lowerable bed as claimed in claim 11, wherein said actuating means is a hydraulic actuator, a linear motor, a combination of a sprocket and a chain, or a combination of a rack and a pinion.

14. The truck with lowerable bed as claimed in claim 6,
wherein said first guiding device further comprises a sprocket and a chain to assist movement of said rear axle.

15. The truck with lowerable bed as claimed in claim 6,
wherein a retractable side guard is attached to said cargo container.

16. The truck with lowerable bed as claimed in claim 6,
wherein said cargo container is a flatbed.

* * * * *